United States Patent
Miller et al.

(10) Patent No.: US 11,128,912 B2
(45) Date of Patent: Sep. 21, 2021

(54) SET-TOP BOX WITH ENHANCED BEHAVIORAL CONTROLS AND SYSTEM AND METHOD FOR USE OF SAME

(71) Applicant: Enseo, Inc., Plano, TX (US)

(72) Inventors: Thomas R. Miller, Plano, TX (US); Vanessa Ogle, Fairview, TX (US)

(73) Assignee: Enseo, LLC, Plano, TX (US)

( * ) Notice: Subject to any disclaimer, the term of this patent is extended or adjusted under 35 U.S.C. 154(b) by 0 days.

(21) Appl. No.: 16/916,771

(22) Filed: Jun. 30, 2020

(65) Prior Publication Data

US 2020/0329274 A1    Oct. 15, 2020

Related U.S. Application Data

(63) Continuation of application No. 16/545,103, filed on Aug. 20, 2019, now Pat. No. 10,701,436, which is a continuation of application No. 15/969,001, filed on May 2, 2018, now Pat. No. 10,390,079.

(60) Provisional application No. 62/500,015, filed on May 2, 2017.

(51) Int. Cl.
| | |
|---|---|
| H04N 21/436 | (2011.01) |
| H04N 21/214 | (2011.01) |
| H04N 21/422 | (2011.01) |
| H04N 21/6587 | (2011.01) |
| G07C 9/00 | (2020.01) |
| H04N 21/41 | (2011.01) |

(52) U.S. Cl.
CPC ... *H04N 21/43615* (2013.01); *G07C 9/00174* (2013.01); *G07C 9/00309* (2013.01); *G07C 9/00904* (2013.01); *H04N 21/2143* (2013.01); *H04N 21/4126* (2013.01); *H04N 21/42204* (2013.01); *H04N 21/6587* (2013.01); *G07C 2009/00507* (2013.01); *G07C 2009/00825* (2013.01); *G07C 2209/62* (2013.01)

(58) Field of Classification Search
None
See application file for complete search history.

(56) References Cited

U.S. PATENT DOCUMENTS

| | | | |
|---|---|---|---|
| 4,717,816 | A | 1/1988 | Raymond et al. |
| 4,947,163 | A | 8/1990 | Henderson et al. |
| 5,745,044 | A | 4/1998 | Hyatt, Jr. et al. |
| 5,774,059 | A | 6/1998 | Henry et al. |
| 5,815,557 | A | 9/1998 | Larson |
| 5,838,251 | A | 11/1998 | Brinkmeyer et al. |
| 5,936,544 | A | 8/1999 | Gonzales et al. |
| 5,979,754 | A | 11/1999 | Martin et al. |
| 6,049,289 | A | 4/2000 | Waggamon et al. |

(Continued)

*Primary Examiner* — Omar S Parra

(74) *Attorney, Agent, or Firm* — Scott Griggs; Griggs Bergen LLP

(57) ABSTRACT

A set-top box with enhanced behavioral controls and system and method for use of the same are disclosed. In one embodiment of the set-top box, a wireless transceiver is located within a housing, which also interconnectedly includes a television input, a television output, a processor, and memory. The set-top box may pair with an electronic door locking apparatus coupled to a door that is room-collocated with the set-top box in a hospitality establishment. The set-top box may then receive a status signal from the electronic door locking apparatus relative to the open/closed status of the door and locked/unlocked status of the door.

19 Claims, 5 Drawing Sheets

(56) References Cited

U.S. PATENT DOCUMENTS

| | | |
|---|---|---|
| 6,166,650 A | 12/2000 | Bruwer |
| 6,300,873 B1 | 10/2001 | Kucharczyk et al. |
| 6,438,450 B1 * | 8/2002 | Lorenzo ................. H04H 20/63 |
| | | 348/E7.071 |
| 6,570,488 B2 | 5/2003 | Kucharczyk et al. |
| 6,975,202 B1 | 12/2005 | Rodriguez et al. |
| 9,258,593 B1 * | 2/2016 | Chen .................. H04N 21/4223 |
| 10,390,079 B2 | 8/2019 | Miller et al. |
| 2011/0314492 A1 * | 12/2011 | Cassidy ........... H04N 21/43615 |
| | | 725/30 |
| 2013/0024222 A1 | 1/2013 | Dunn |
| 2017/0127222 A1 * | 5/2017 | Lang .................... H04W 4/021 |

* cited by examiner

SET-TOP BOX WITH ENHANCED BEHAVIORAL CONTROLS AND SYSTEM AND METHOD FOR USE OF SAME

PRIORITY STATEMENT & CROSS REFERENCE TO RELATED APPLICATIONS

This application is a continuation of U.S. patent application Ser. No. 16/545,103 entitled "Set-Top Box with Enhanced Behavioral Controls and System and Method for Use of Same" filed on Aug. 20, 2019, in the names of Thomas R. Miller et al., now U.S. Pat. No. 10,701,436, issued on Jun. 30, 2020; which is a continuation of U.S. patent application Ser. No. 15/969,001 entitled "Set-Top Box with Enhanced Behavioral Controls and System and Method for Use of Same" filed on May 2, 2018, in the names of Thomas R. Miller et al., now U.S. Pat. No. 10,390,079, issued on Aug. 20, 2019; which claims priority from U.S. patent application Ser. No. 62/500,015 entitled "Set-Top Box with Enhanced Behavioral Controls and System and Method for Use of Same" filed on May 2, 2017, in the name of Vanessa Ogle; all of which are hereby incorporated, in entirety, by reference for all purposes.

TECHNICAL FIELD OF THE INVENTION

This invention relates, in general, to set-top boxes and, in particular, to set-top boxes with enhanced behavior controls and systems and methods for use of the same that address the work and function of locking systems within a room in a hospitality establishment, for example.

BACKGROUND OF THE INVENTION

Without limiting the scope of the present invention, the background will be described in relation to locking systems in the hospitality lodging industry, as an example. Known locking systems include a mechanical lock requiring a physical key inserted into the lock in order to open the lock for access. More advanced known locking systems include magnetic access cards and radio frequency identification (RFID) access cards; both of which use various encoding schemes and contact or proximity in order to open the lock for access. Consumers and particularly hotel guests are demanding enhanced capabilities in ever increasingly easy-to-use platforms. As a result of such consumer and hotel guest preferences, the locking systems must address issues of convenience in addition to traditional problems of misplacement and security. Accordingly, there is a need for improved systems and methods for use of the same that address the work and function of locking systems within a room in a hospitality establishment, for example.

SUMMARY OF THE INVENTION

It would be advantageous to achieve a set-top box that would improve upon existing limitations in functionality with respect to locking systems. It would also be desirable to enable a computer-based electronics and software solution that would provide enhanced behavioral controls in an easy-to-use platform in the hospitality lodging industry or in another environment. To better address one or more of these concerns, a set-top box with enhanced behavioral controls and system and method for use of the same are disclosed. In one embodiment of the set-top box, a wireless transceiver is associated with a housing, which also interconnectedly includes a television input, a television output, a processor, and memory.

The set-top box may pair with an electronic door locking apparatus coupled to a door that is room-collocated with the set-top box in a hospitality establishment. The set-top box may then receive a status signal from the electronic door locking apparatus relative to the open/closed status of the door or locked/unlocked status of the door, for example. In another aspect, the set-top box may forward the status signal to a display associated with the set-top box or forward the status signal to a server, which may be located remotely.

In a further aspect, the set-top box may identify a proximate wireless-enabled interactive device and responsive to identifying the proximate wireless-enabled interactive device, receive guest control instructions regarding control functionality input to control the electronic door apparatus and send a command to the electronic door apparatus. In a further aspect, the set-top box may receive control functionality input instructions to control the electronic door apparatus from a remote server and process these instructions and send a command to the electronic door apparatus. Further, the set-top box in combination with the remote server may evaluate access keycard data and determine access rights at the electronic door apparatus responsive thereto. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
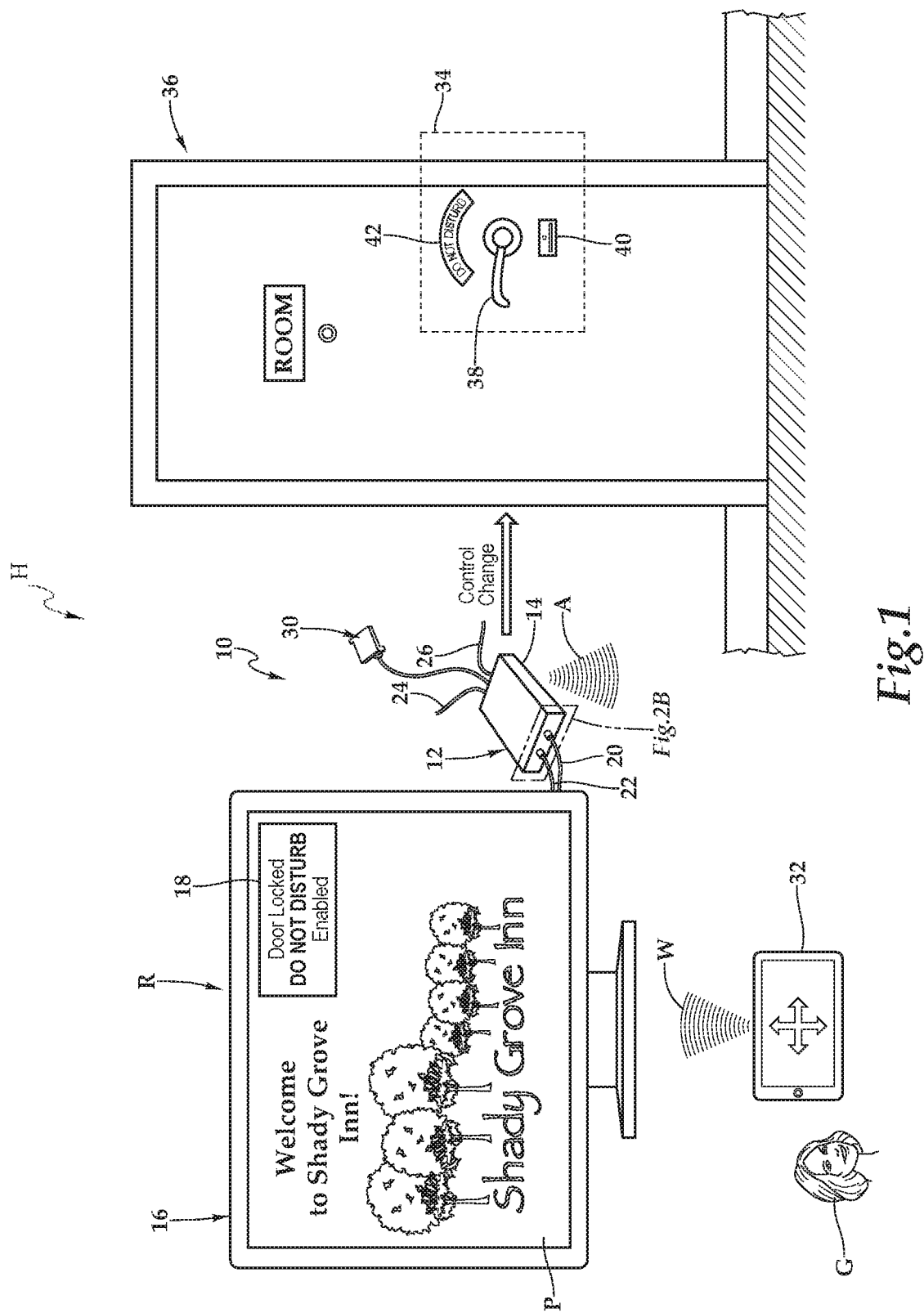
FIG. 1 is a schematic diagram depicting one embodiment of a system for providing a set-top box having enhanced behavioral controls therein according to the teachings presented herein.

Referring initially to FIG. 1, therein is depicted one embodiment of a system 10 utilizing a set-top box 12 with enhanced behavioral controls being employed within a hospitality lodging establishment. The hospitality lodging establishment or, more generally, hospitality property, may be a furnished multi-family residence, dormitory, lodging establishment, hotel, hospital, or other multi-unit environment. As shown, by way of example and not by way of limitation, the hospitality environment is depicted as a hotel H having various rooms, including room R, and spaces, which may be common spaces. The set-top box 12 includes a housing 14 and is communicatively disposed with various amenities associated with the hospitality environment, including a display 16. Set-top boxes, like the set-top box 12, may be deployed throughout the rooms and spaces of the hotel H.

As shown, in one embodiment, within a room R or space, such as a lobby, elevator foyer, or other common space, for example, the system 10 includes the set-top box 12 and the display 16, which is illustrated as a television having a screen with a message 18. It should be appreciated however, that the display 16 may also be any electronic visual display device, for example. A connection, which is depicted as an HDMI connection 20, connects the set-top box 12 to the display 16. Other connections include a power cable 22 coupling the set-top box 12 to a power source, a coaxial cable 24 coupling the set-top box 12 to an external cable source, and a category five (Cat 5) cable 26 coupling the set-top box 12 to an external pay-per-view source at a hotel or other lodging establishment, for example. As shown, the set-top box 12 may include a dongle 30 providing particular technology and functionality extensions thereto. That is, the set-top box 12 may be set-top box-dongle combination in one embodiment. More generally, it should be appreciated that the cabling connected to the set-top box 12 will depend on the environment and application, and the cabling connections presented in FIG. 1 are depicted for illustrative purposes. Further, it should be appreciated that the positioning of the set-top box 12 will vary depending on environment and application and, with certain functionality, the set-top box 12 may be placed more discretely behind the display 16.

A proximate wireless-enabled interactive programmable device 32 may be a device, including handheld devices, that may be supplied or carried by the guest G and may be selected from a range of existing devices, such as, iPads®, iPhones®, iPod Touch®, Android® devices, Blackberry® devices, personal computers, laptops, tablet computers, smart phones, and smart watches, for example. In one implementation, advertising broadcast data originating from the set-top box 12 or the proximate wireless-enabled interactive programmable device 32 may be utilized to identify the proximate wireless-enabled interactive programmable device 32. Moreover, as will also be discussed in further detail hereinbelow, in another implementation, an application installed from a server enables the set-top box 12 and the proximate wireless-enabled interactive programmable device 32 to be wirelessly paired. In another embodiment, a challenge-response is utilized to wirelessly pair the set-top box 12 and the proximate wireless-enabled interactive programmable device 32.

As shown, an interactive portal P is displayed on the display 16, which displays a general welcome for the hospitality lodging establishment. In one implementation, as illustrated, the set-top box 12 extends a physical authorization interface, shown as area A, from the set-top box to an area easily accessible to a guest's convenience within the room R. This physical authorization interface A may include a short range wireless data connection that is enabled only when very close physically to the proximate wireless-enabled interactive programmable device 32, for example.

The set-top box 12 may pair with an electronic door locking apparatus 34 coupled to a door 36 that is room-collocated with the set-top box 12 in the room R of the hospitality establishment. As shown, the door 36 includes a handle 38 with an electronic reader 40 and an indicator 42 that indicates "Do Not Disturb." The set-top box 12 may then receive a status signal from the electronic door locking apparatus 34 relative to the open/closed status of the door 36 or locked/unlocked status of the door 36, for example. In another aspect, the set-top box 12 may forward the status signal to the display 16 associated with the set-top box 12 or forward the status signal to a server, such as a server 44 discussed in FIG. 2A and FIG. 2B. As shown, the set-top box 12 has received the status signal from the electronic door locking apparatus 34 that the door 36 is locked with the indicator 42 is indicating "Do Not Disturb." This status may be shown on the display 16 at the message 18, which may be selectively and controllably actuatable.

The set-top box 12 may utilize a search operation, for example, to identify the proximate wireless-enabled interactive device 32 and responsive to identifying the proximate wireless-enabled interactive programmable device 32, receive guest control instructions regarding control functionality input and send a command to the electronic door apparatus 34. The guest control instructions may be a wireless transmission W. In another embodiment, the set-top box may receive control functionality input instructions from a remote server, such as the server 44 of FIG. 2A and FIG. 2B, and process these instructions and send a command to the electronic door apparatus 34. Further, the set-top box 12 in combination with the remote server, such as the server 44 of FIG. 2A and FIG. 2B, may evaluate access keycard data and determine access rights at the electronic door apparatus 34 responsive thereto.

Figure 2A:
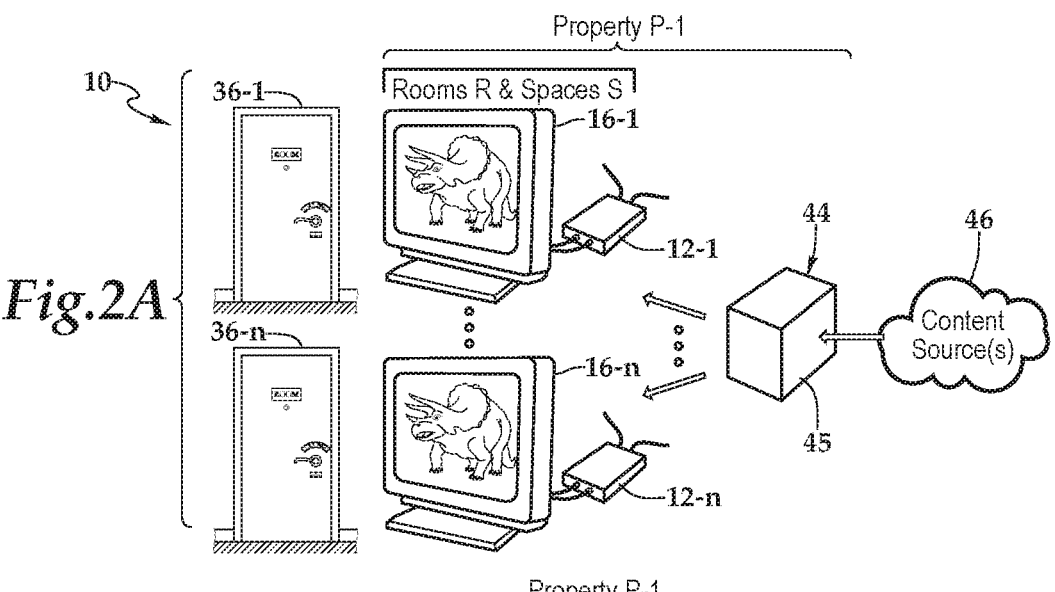
FIG. 2A is a schematic diagram depicting one embodiment of the system of FIG. 1 within an on-property deployment.

It should be appreciated that the server 44 may be located on a single property to serve one or more televisions thereon. Further, it should be appreciated that the server 44 may be remotely located to serve multiple properties having multiple televisions. Referring now to FIG. 2A, the system 10 may be deployed such that the server 44 is co-located on the property P-1 with the displays 16-1 . . . 16-n and the corresponding set-top boxes 12-1 . . . 12-n, and doors 36-1 . . . 36-n, with, in one embodiment, content sources 46 configured to provide sources of content. As shown, the server 44 includes a housing 45 having a television output and other components therein. As previously alluded, the server 44 may store the access keycard data for access by the set-top box 12 or, alternatively, for downloading prior to use by the set-top box 12.

Figure 2B:
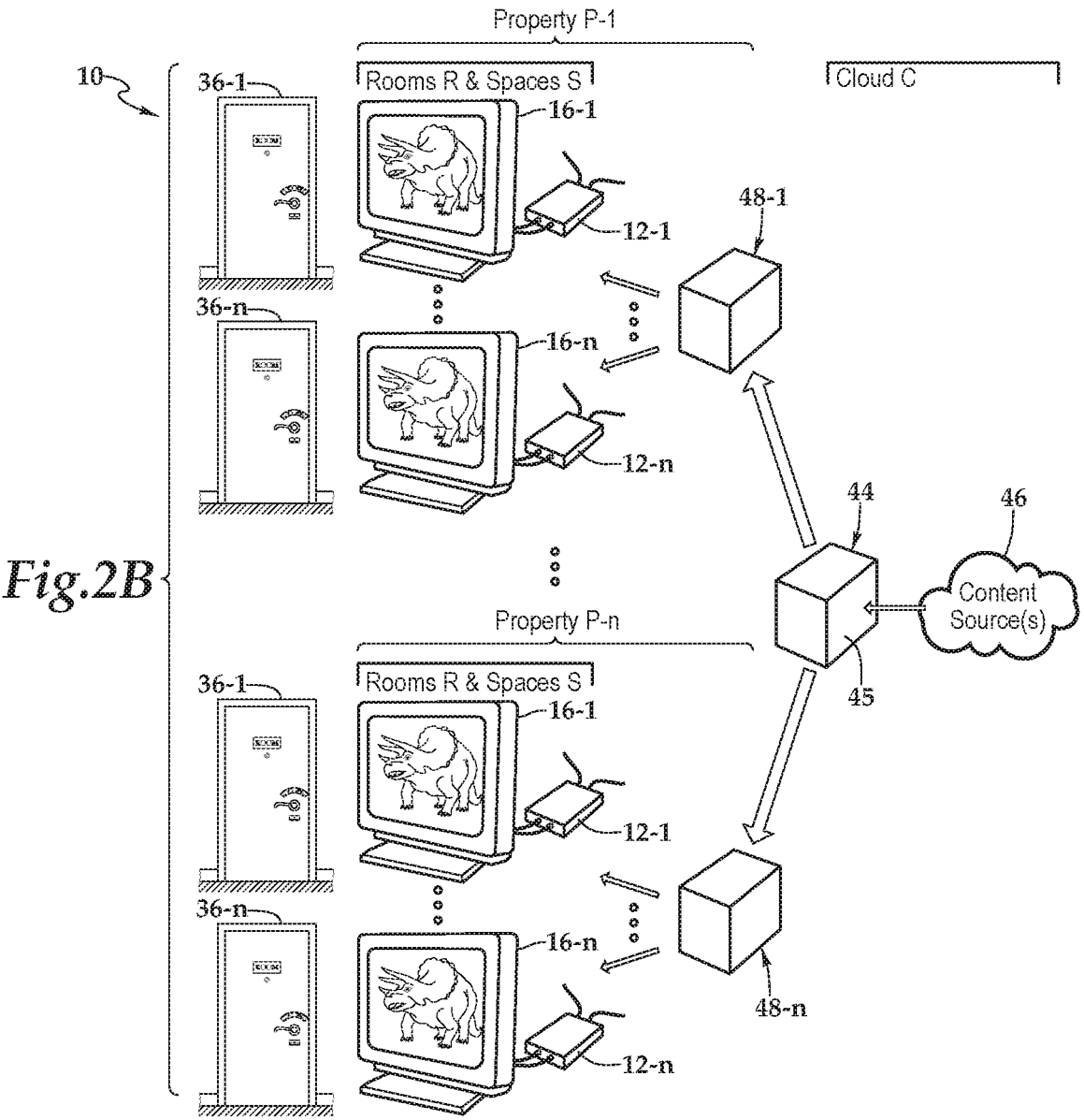
FIG. 2B is a schematic diagram depicting one embodiment of the system of FIG. 1 within a cloud-computing deployment.
Figure 3A:
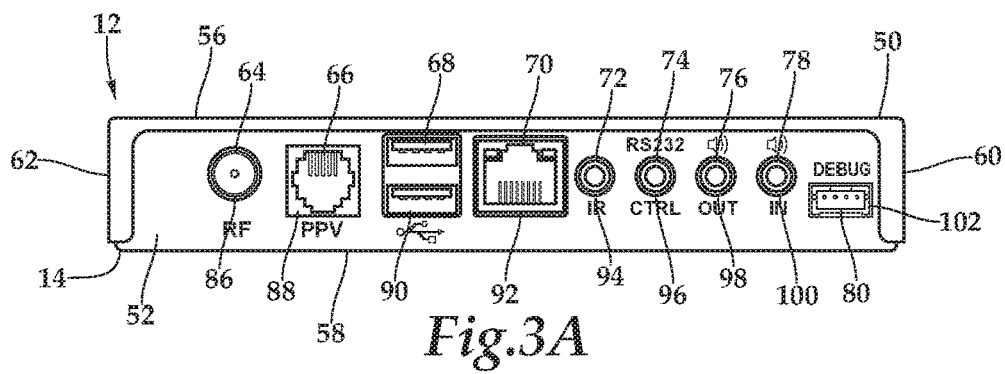
FIG. 3A is a wall-facing exterior elevation view of one embodiment of the set-top box depicted in FIG. 1 in further detail.
Figure 3B:
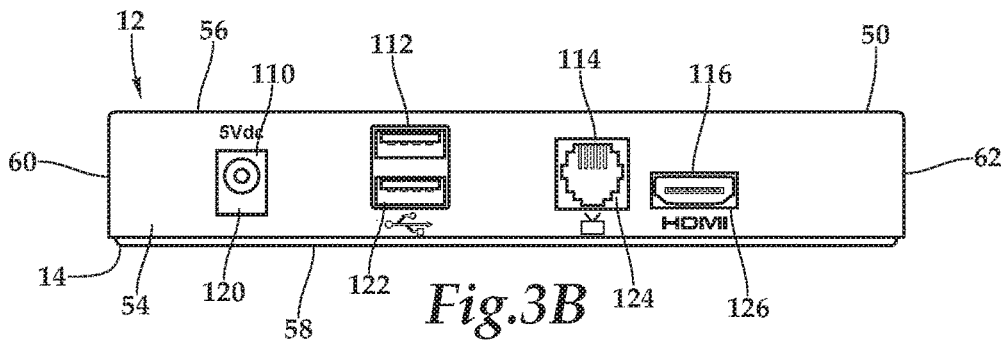
FIG. 3B is a television-facing exterior elevation view of the set-top box depicted in FIG. 1.
Figure 3C:
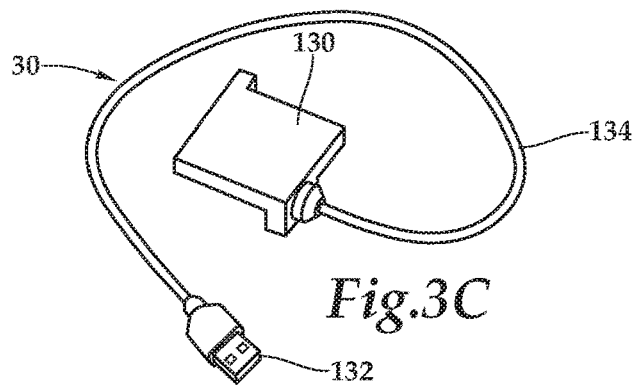
FIG. 3C is a front perspective view of a dongle depicted in FIG. 1 in further detail.
Figure 4:
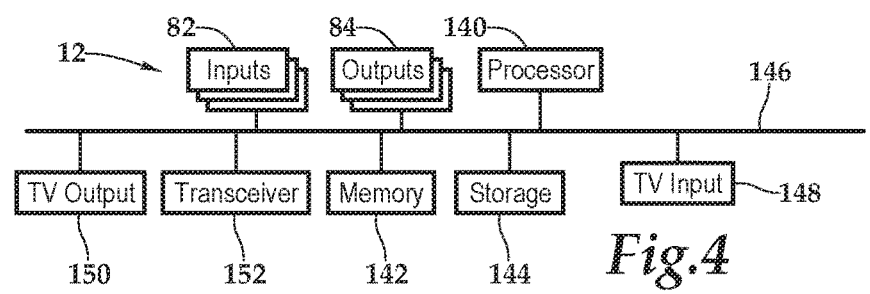
FIG. 4 is a functional block diagram depicting one embodiment of the set-top box presented in FIGS. 3A and 3B.

Referring to FIG. 2B, the system 10 may be deployed such that the server 44 is located remotely within cloud C relative to displays 16-1 . . . 16-n, which are located at properties P-1 through P-n. In particular, the server 44, which receives content from content sources 46, may be located remotely relative to the displays 16-1 . . . 16-n and any set-top boxes 12-1 . . . 12-n with the doors 36-1 . . . 36-n such that a property headend 48-1 . . . 48-n is interposed between the server 44 and the displays 16-1 . . . 16-n. As shown, in this implementation, the property headend 48-1 . . . 48-n is co-located with the displays 16-1 . . . 16-n at a respective property, P-1 through P-n.

Referring to FIG. 3A, FIG. 3B, FIG. 3C, and FIG. 4, as used herein, set-top boxes, back boxes and set-top/back boxes may be discussed as set-top boxes. By way of example, the set-top box 12 may be a set-top unit that is an information appliance device that generally contains set-top box functionality including having a television-tuner input and displays output through a connection to a display or television set and an external source of signal, turning by way of tuning the source signal into content in a form that can then be displayed on the television screen or other display device. Such set-top boxes are used in cable television, satellite television, and over-the-air television systems, for example.

The set-top box 12 includes a housing 14 with a cover 50 and a rear wall 52, front wall 54, top wall 56, bottom base 58, and two sidewalls 60, 62. It should be appreciated that front wall, rear wall, and side wall are relative terms used for descriptive purposes and the orientation and the nomenclature of the walls may vary depending on application. The front wall includes various ports, ports 64, 66, 68, 70, 72, 74, 76, 78, and 80 that provide interfaces for various interfaces, including inputs and outputs. In one implementation, as illustrated, the ports 64 through 80 include inputs 82 and outputs 84 and, more particularly, an RF input 86, a RJ-45 input 88, universal serial bus (USB) input/outputs 90, an Ethernet category 5 (Cat 5) coupling 92, an internal reset 94, an RS232 control 96, an audio out 98, an audio in 100, and a debug/maintenance port 102. The front wall 54 also includes various inputs 82 and outputs 84. More particularly, ports 110, 112, 114, and 116 include a 5V dc power connection 120, USB inputs/outputs 122, an RJ-45 coupling 124, and an HDMI port 126. It should be appreciated that the configuration of ports may vary with the set-top box depending on application and context. As previously alluded to, the housing 14 may include a housing-dongle combination including, with respect to the dongle 30, a unit 130 having a cable 134 with a set-top box connector 132 for selectively coupling with the set-top box 12.

Within the housing 14, a processor 140, memory 142, storage 144, the inputs 82, and the outputs 84 are interconnected by a bus architecture 146 within a mounting architecture. It should be understood that the processor 140, memory 142, storage 144, the inputs 82, and the outputs 84 may be entirely contained within the housing 14 or the housing-dongle combination. The processor 140 may process instructions for execution within the computing device, including instructions stored in the memory 142 or in storage 144. The memory 142 stores information within the computing device. In one implementation, the memory 142 is a volatile memory unit or units. In another implementation, the memory 142 is a non-volatile memory unit or units. Storage 144 provides capacity that is capable of providing mass storage for the set-top box 12. Various inputs 82 and outputs 84 provide connections to and from the computing device, wherein the inputs 82 are the signals or data received by the set-top box 12, and the outputs 84 are the signals or data sent from the set-top box 12.

A television content signal input 148 and a television output 150 are also secured in the housing 14 in order to receive content from a source in the hospitality property and forward the content, including external content such as cable and satellite and pay-per-view (PPV) programming, to the television located within the hotel room.

A transceiver 152 is associated with the set-top box 12 and communicatively disposed with the bus 146. As shown the transceiver 152 may be internal, external, or a combination thereof to the housing. Further, the transceiver 152 may be a transmitter/receiver, receiver, or an antenna for example. Communication between various amenities in the hotel room and the set-top box 12 may be enabled by a variety of wireless methodologies employed by the transceiver 152, including 802.11, 3G, 4G, Edge, WiFi, ZigBee, near field communications (NFC), Bluetooth low energy and Bluetooth, for example. Also, infrared (IR) may be utilized.

The memory 142 and storage 144 are accessible to the processor 140 and include processor-executable instructions that, when executed, cause the processor 140 to execute a series of operations. The processor-executable instructions cause the processor to forward a fully tuned signal to the display. Further, the instructions may cause the processor to pair with an electronic door locking apparatus coupled to a door. The processor-executable instructions may cause the processor to receive a status signal from the electronic door locking apparatus. In one implementation, the status signal may be relative to the open/closed status of the door or locked/unlocked status of the door, for example. By way of further example, the status signal may relate to the "Do Not Disturb" status of the door or a power state of the electronic door apparatus.

In one implementation, the processor-executable instructions may further include instructions that, when executed, cause the processor to forward a fully tuned signal to the display including a status indicator based on the received status signal. Alternatively or in addition, the processor-executable instructions may cause the processor to forward a status indicator based on the received status signal to a remote server, such as the server 44 of FIGS. 2A and 2B.

In another implementation, the processor-executable instructions may further include instructions that, when executed, cause the processor to specify a search operation to identify a proximate wireless-enabled interactive programmable device. The search operation may utilize the wireless transceiver to wirelessly identify the proximate wireless-enabled interactive programmable device. By way of example, with respect to the search operation, the processor-executable instructions may specify a search operation to identify the proximate wireless-enabled interactive programmable device by receiving advertising broadcast data from the proximate wireless-enabled interactive programmable device via the wireless transceiver using, for example, a Bluetooth low energy standard, wherein the search operation utilizes the wireless transceiver to wirelessly identify the proximate wireless-enabled interactive programmable device. Alternatively, the processor-executable instructions, when executed, cause the processor to specify a search operation to identify the proximate wireless-enabled interactive device by transmitting advertising broadcast data via the wireless transceiver using, for example, a Bluetooth low energy standard, wherein the search operation utilizes the wireless transceiver to wirelessly identify the proximate wireless-enabled interactive programmable device.

The processor-executable instructions may further include instructions that establish a pairing between the proximate wireless-enabled interactive programmable device and the set-top box. The processor-executable instructions may then cause the processor to send formatted parallel audiovisual experience instructions to the proximate wireless-enabled interactive programmable device. In one implementation, the formatted parallel audiovisual experience instructions may be configured to provide a downstream parallel experience related to the content on the television.

The processor-executable instructions may still further include instructions that provide for virtual buttons on a touch screen display associated with the proximate wireless-enabled interactive programmable device. The virtual buttons are associated with the proximate wireless-enabled interactive programmable device. Instructions may then cause the processor to receive and process virtual remote control functionality input instructions to control the electronic door locking apparatus from the proximate wireless-enabled interactive programmable device and evaluate the functionality input instructions to assign a meaning. Following the evaluation, the processor-executable instructions may generate a command signal and send the command signal to the electronic door locking apparatus to effect the command. By way of example and not by way of limitation, the command signal may relate to causing the electronic door locking apparatus to unlock the door or alternate the do not disturb status.

In one embodiment, the processor-executable instructions may further include instructions that, when executed, cause the processor to receive and process server control functionality input instructions to control the electronic door locking apparatus from a remote server, evaluate the functionality input instructions to assign a meaning, generate a command signal, and send the command signal to the electronic door locking apparatus. The command signal may relate to re-programming the electronic door locking apparatus or maintaining access beyond data, for example. In another embodiment, the processor-executable instructions may further include instructions that, when executed, cause the processor to receive and process keycard data from the electronic door locking apparatus, evaluate the keycard data to determine access rights, generate a command signal relative to the access rights, and send the command signal to the electronic door locking apparatus.

Figure 5:
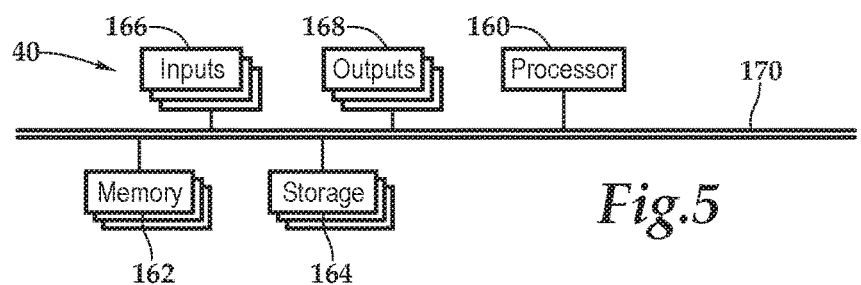
FIG. 5 is a functional block diagram depicting one embodiment of a server presented in FIGS. 2A and 2B.

Referring now to FIG. 5, one embodiment of the server 44 as a computing device includes a processor 160, memory 162, storage 164, inputs 166, and outputs 168 interconnected with various buses 170 in a common or distributed, for example, mounting architecture. In other implementations, in the computing device, multiple processors and/or multiple buses may be used, as appropriate, along with multiple memories and types of memory. Further still, in other implementations, multiple computing devices may be provided and operations distributed therebetween. The processor 160 may process instructions for execution within the server 40, including instructions stored in the memory 162 or in storage 164. The memory 162 stores information within the computing device. In one implementation, the memory 162 is a volatile memory unit or units. In another implementation, the memory 162 is a non-volatile memory unit or units. Storage 164 includes capacity that is capable of providing mass storage for the server 44. Various inputs 166 and outputs 168 provide connections to and from the server 40, wherein the inputs 166 are the signals or data received by the server 44, and the outputs 168 are the signals or data sent from the server 44.

The memory 162 is accessible to the processor 160 and includes processor-executable instructions that, when executed, cause the processor 160 to execute a series of operations. The processor-executable instructions cause the processor to update periodically or on-demand, depending on the operational configuration, a database or update portion thereof, with current access keycard data relative to the electronic door locking apparatuses to one or more of the set-top boxes directly or through a property headend.

The processor-executable instructions may also generate a command signal and send the command signal to the electronic door locking apparatus via the set-top box. By way of example and not by way of limitation, the command signal may relate to causing the electronic door locking apparatus to unlock the door or alternate the do not disturb status. Further, in one embodiment, the command signal may be multiple signals that relate to reprogramming one or more of the electronic door locking apparatuses via the set-top boxes, for example. Additionally, similar to the display, the server 44 may receive various status signals and have processor-executable instructions relative thereto.

Thus, the systems and methods disclosed herein enable set-top boxes to have enhanced behavior controls that control electronic door locking apparatuses. Further, the systems and methods disclosed herein may enable users to use existing electronic devices as a temporary remote control device to control an electronic door locking apparatus via a set-top box. Additionally, the status of the electronic door locking apparatuses may be discerned. Therefore, the systems and methods presented herein avoid the need for additional or expensive high functionality remote controls.

Figure 6:
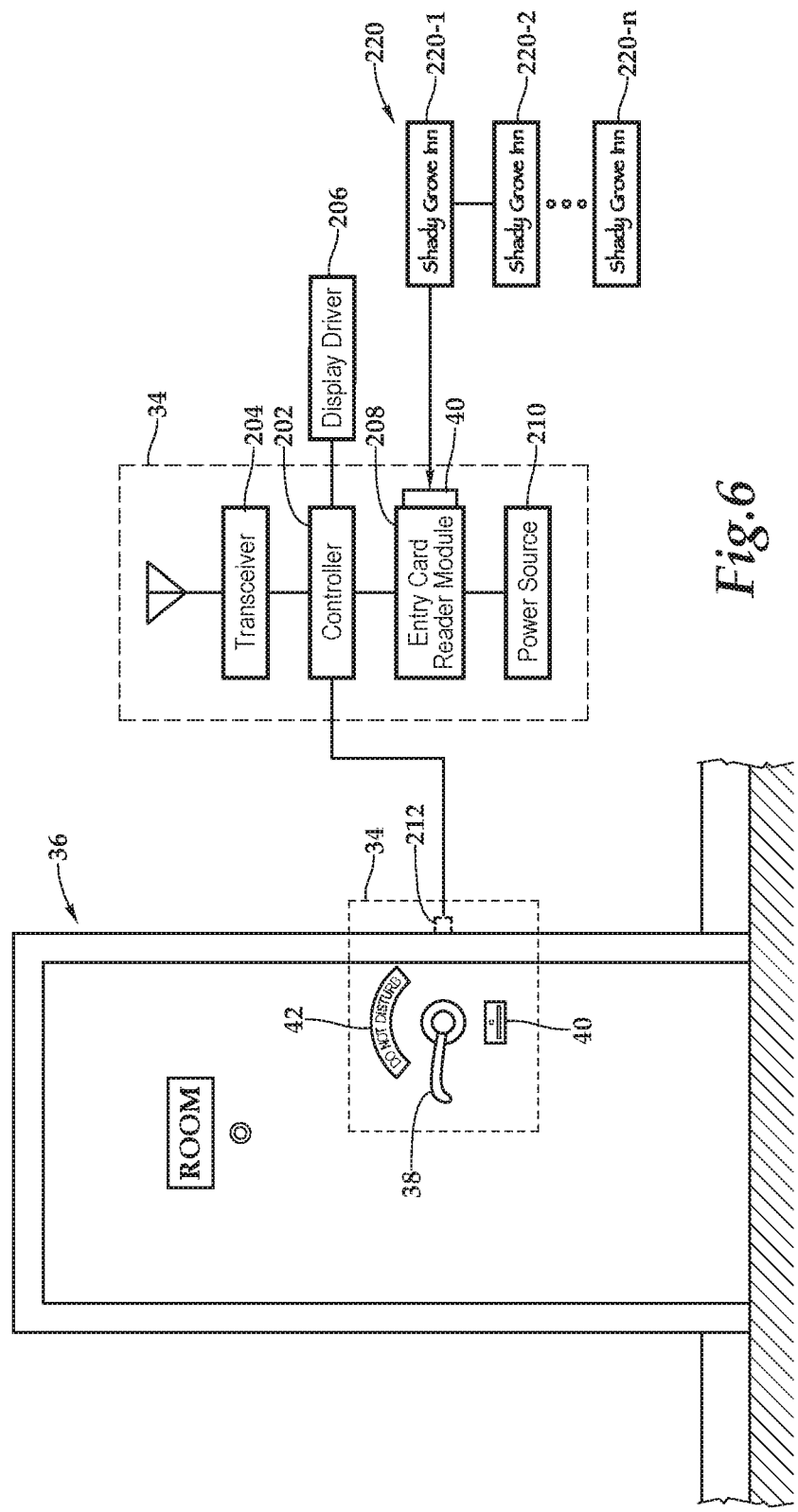
FIG. 6 is a schematic block diagram of one embodiment of a door and door locking apparatus depicted in FIG. 1.

Referring now to FIG. 6, one embodiment of the door locking apparatus 34 is depicted. As shown, the door locking apparatus 34 may be mounted adjacent the door 36 or on the door 36 or in another suitable location. The door locking apparatus 34 may be an integral unit that is easily mounted at each door site and may include several components. The components of the door locking apparatus 34 may include a controller 202 coupled to a transceiver 204 and a display driver 206, which is coupled to the display 42. Additionally, the electronic reader 40 is supported by an entry card reader module 208. A power source 210 supplies power to the door locking apparatus and may include battery power or a wired electrical interface connection, for example, to a 120V source. A door lock actuator 212 is coupled to the controller 202 and locks/unlocks the door 36.

The electronic reader 40 and the entry card reader module 208 perform the task of reading the entry card as a door key and delivering the card identity information to the controller 202. It should be appreciated that the electronic reader 40 and the entry card reader module 208 may be equipped to work with either magnetic strip cards, radio-frequency identification (RFID) cards, or wireless interactive programmable devices, for example. Further, the entry cards 220, including entry cards 220-1, 220-2, . . . 220-n, and the electronic door locking apparatus 34 may utilize key identification locking wherein the system is programmed to accept multiple identifications, for example a master identification for staff and various guest identifications. Other key identification locking schemes that may be utilized include sequence identification where a newer sequence identification will inform the electronic door locking apparatus 34 to stop accepting an older sequence identification, expiration date based key identification locking, or check-in date-based key identification locking, for example.

The controller 202 is electronically connected to receive information from the entry card reader module 208 and compare information with current access keycard data relative to the electronic door locking apparatus 34 stored at the controller 202 or the set-top box 12 via the use of the transceiver 204. The electronic door locking apparatus generates a lock actuation signal, which is sent to lock actuator 212, when it determines that an entry card, such as entry card 220-1 being read at the electronic reader 40 matches an approved card. The controller 202 may include an associated memory for storing information received from the set-top box 12, allowing all such stored information to be continually available. While it is necessary to have a local controller 202 which has memory and processing capability as described herein, it should be appreciated that a portion or all of the processing tasks of the controller 202 may be performed by the set-top box 12 or the set-top box 12 in combination with the server 44.

In operation, the controller 202 may send status signals to the set-top box 12 via the aforementioned pairing relative to the power status, such as low battery or power source good or power source needs maintenance, or the status of the door such as being open/closed or locked/unlocked. The status signals may also indicate which entry cards are utilized and attempted to be utilized to gain entry to the door 36. The status signal may also relate to the status of the "Do Not Disturb" indication, which may be electronically shown on the display 16. In addition to sending status signals, the electronic door locking apparatus 34 may receive commands from the set-top box 12 or the server 44 via the set-top box 12 or a guest via the set-top box 12, for example. Such commands may relate to unlocking the door, changing the "Do Not Disturb" status, or reprogramming the keycard data relative to an access keycard database.

Figure 7:
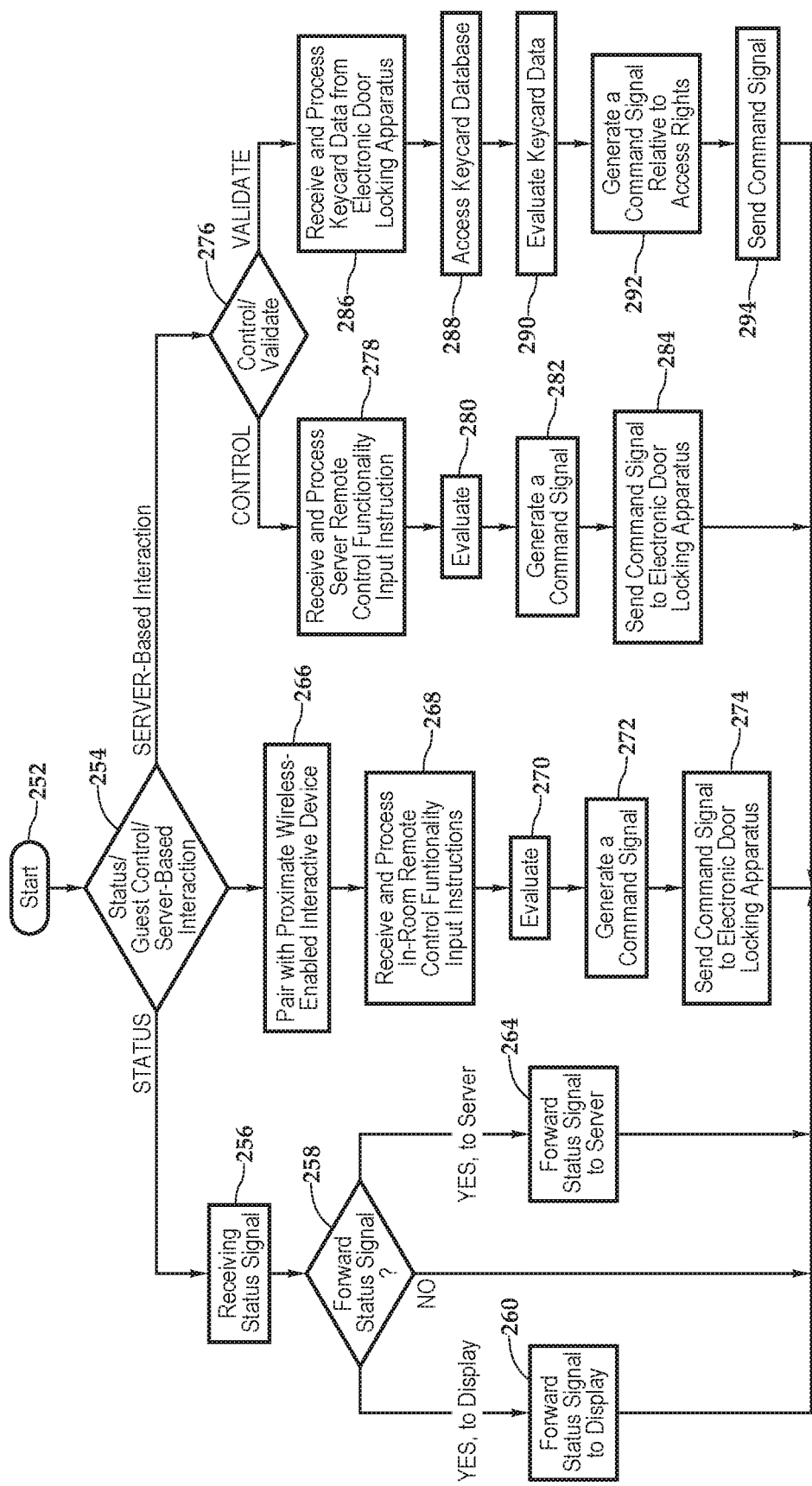
FIG. 7 is a flow chart depicting one embodiment of a method for providing a set-top box having enhanced behavioral controls according to the teachings presented herein.

FIG. 7 depicts one embodiment of a method for providing enhanced content, according to the teachings presented herein. The methodology starts at block 252 where a pairing may be established between the set-top box and electronic locking apparatus, which is room co-located with the set-top box. At decision block 254, the methodology may provide status information, guest control, or server-based interaction. With respect to status information, the methodology advances to block 256 where the set-top box receives a status signal from the electronic door locking apparatus 34. The status signal may relate to the open/closed status of the door, locked/unlocked status of the door, a "Do Not Disturb" status of the door, a power state of the electronic door locking apparatus, or the successful/unsuccessful use of a keycard at the electronic door locking apparatus. At decision block 258, the status signal may or may not be forwarded to the display or server. If the status signal is forwarded to the display, then the methodology advances to block 260 where the status signal is forwarded to the display for displaying. If the status signal is not to be forwarded, then the methodology ends at block 262. On the other hand, if the status signal is to be forwarded to the server, then the methodology advances to block 264 where the status signal is forwarded to the server for receipt and processing.

Returning to decision block 254, with respect to guest control, at block 266, the set-top box may be paired with a proximate wireless-enabled interactive programmable device and then at block 268, the set-top box may receive and process in-room remote control functionality input instructions from the proximate wireless-enabled interactive programmable device. At block 270, the in-room remote control functionality input instructions are evaluated and at block 272 a command signal is generated at the set-top box prior to being sent at block 274. The in-room remote control functionality input instructions and related command signal may relate to relate to requesting a status, unlocking the door, or changing a "Do Not Disturb" status of the door, for example.

Returning to decision block 254, with respect to server-based interaction, the methodology advances to decision block 276 where the set-top box and server may perform, in one implementation control or validation operations. With respect to control, at block 278, the set-top box may receive and process server remote control functionality input instructions from the proximate wireless-enabled interactive programmable device. At block 280, the server remote control functionality input instructions are evaluated and at block 282 a command signal is generated at the set-top box prior to being sent at block 284. The server remote control functionality input instructions and related command signal may relate to relate to requesting a status of the electronic door locking apparatus, unlocking the door, changing a "Do Not Disturb" status of the door, or re-programming the keycard data relative to an access keycard database stored at the set-top box or electronic door locking apparatus, for example.

Returning to decision block 276, with respect to validation, advancing to block 286 the set-top box may receive and process keycard data from the electronic door locking apparatus to determine access rights associated with the keycard. At block 288, in one embodiment, the access keycard database associated with the set-top box or the server is checked so that at block 290, the keycard data may be evaluated. At block 292, a command signal is generated relative to the access rights, e.g, permission granted to open the door, no permission to open the door. At block 294, the command signal is sent from the set-top box to the electronic door locking apparatus.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A set-top box comprising:
    a housing securing a television input, a television output, a processor, memory, and storage therein;
    a busing architecture communicatively interconnecting the television input, the television output, the processor, the memory, and the storage;
    a wireless transceiver associated with the housing and coupled to the busing architecture, the wireless transceiver operable to communicate with a proximate wireless-enabled interactive programmable device;
    the television input configured to receive a source signal from an external source;
    the television output configured to forward a fully tuned signal to a display;
    the memory accessible to the processor, the memory including first processor-executable instructions that, when executed, cause the processor to:
        pair with an electronic door locking apparatus coupled to a door, the electronic door locking apparatus being room-collocated with the set-top box, and
        receive a status signal from the electronic door locking apparatus, the status signal being relative to a locked/unlocked status of the door; and the memory including second processor-executable instructions that, when executed, cause the processor to:
  receive and process server control functionality input instructions from a remote server,
  evaluate the functionality input instructions to assign a meaning,
  generate a command signal, and
  send the command signal to the electronic door locking apparatus.

2. The set-top box as recited in claim 1, wherein the status signal is further relative to a do not disturb status of the door.

3. The set-top box as recited in claim 1, wherein the status signal is further relative to a power state of the electronic door locking apparatus.

4. The set-top box as recited in claim 1, wherein the processor-executable instructions further comprise instructions that, when executed, cause the processor to forward a fully tuned signal to the display including a status indicator based on the received status signal.

5. The set-top box as recited in claim 1, wherein the processor-executable instructions further comprise instructions that, when executed, cause the processor to forward a status indicator based on the received status signal to a remote server.

6. The set-top box as recited in claim 1, wherein the processor-executable instructions further comprise instructions that, when executed, cause the processor to:
  specify a search operation to identify a proximate wireless-enabled interactive programmable device, wherein the search operation utilizes the wireless transceiver to wirelessly identify the proximate wireless-enabled interactive programmable device;
  establish a pairing between the proximate wireless-enabled interactive programmable device and the set-top box;
  send formatted parallel audiovisual experience instructions to the proximate wireless-enabled interactive programmable device, wherein the formatted parallel audiovisual experience instructions are configured to provide a downstream parallel experience related to content on the television;
  provide instructions for virtual buttons on a touch screen display associated with the proximate wireless-enabled interactive programmable device, the virtual buttons being associated with the proximate wireless-enabled interactive programmable device;
  receive and process virtual remote control functionality input instructions from the proximate wireless-enabled interactive programmable device;
  evaluate the functionality input instructions to assign a meaning;
  generate a command signal; and
  send the command signal to the electronic door locking apparatus.

7. The set-top box as recited in claim 6, wherein the command signal relates to causing the electronic door locking apparatus to unlock the door.

8. The set-top box as recited in claim 6, wherein the command signal relates to causing the electronic door locking apparatus to alternate the do not disturb status.

9. The set-top box as recited in claim 1, wherein the command signal relates to re-programming the electronic door locking apparatus.

10. The set-top box as recited in claim 1, wherein the processor-executable instructions further comprise instructions that, when executed, cause the processor to:
  receive and process keycard data from the electronic door locking apparatus;
  evaluate the keycard data to determine access rights;
  generate a command signal relative to the access rights; and
  send the command signal to the electronic door locking apparatus.

11. The set-top box as recited in claim 1, wherein the display further comprises a device selected from the group consisting of electronic visual display devices and televisions.

12. The set-top box as recited in claim 1, wherein the housing further comprises a housing-dongle combination securing the television input, the television output, the processor, the memory, the storage, and the wireless transceiver therewith.

13. The set-top box as recited in claim 12, wherein the processor and the memory are distributed through the housing-dongle combination.

14. The set-top box as recited in claim 1, wherein the wireless transceiver is configured to communicate with the electronic door locking apparatus via a standard selected from the group consisting of infrared (IR), 802.11, 3G, 4G, Edge, Wi-Fi, ZigBee, near field communications (NFC), Bluetooth, and Bluetooth low energy.

15. The set-top box as recited in claim 1, wherein the wireless transceiver is configured to communicate with the electronic door locking apparatus via a short distance data exchange standard.

16. A set-top box comprising:
  a housing securing a television input, a television output, a processor, memory, and storage therein;
  a busing architecture communicatively interconnecting the television input, the television output, the processor, the memory, and the storage;
  a wireless transceiver associated with the housing and coupled to the busing architecture, the wireless transceiver operable to communicate with a proximate wireless-enabled interactive programmable device;
  the television input configured to receive a source signal from an external source;
  the television output configured to forward a fully tuned signal to a display; and
  the memory accessible to the processor, the memory including first processor-executable instructions that, when executed, cause the processor to:
    pair with an electronic door locking apparatus coupled to a door, the electronic door locking apparatus being room-collocated with the set-top box,
    receive a status signal from the electronic door locking apparatus, the status signal being relative to a locked/unlocked status of the door, and
    send the status signal to a remote server;
  the memory including second processor-executable instructions that, when executed, cause the processor to:
    specify a search operation to identify the proximate wireless-enabled interactive programmable device, wherein the search operation utilizes the wireless transceiver to wirelessly identify the proximate wireless-enabled interactive programmable device,
    establish a pairing between the proximate wireless-enabled interactive programmable device and the set-top box,
    receive and process virtual remote control functionality input instructions from the proximate wireless-enabled interactive programmable device, and evaluate the functionality input instructions to assign a meaning, generate a command signal, and send the command signal to the electronic door locking apparatus; and the memory including third processor-executable instructions that, when executed, cause the processor to:
receive and process server control functionality input instructions from a remote server,
evaluate the functionality input instructions to assign a meaning,
generate a command signal, and
send the command signal to the electronic door locking apparatus.

17. The set-top box as recited in claim 16, wherein the command signal relates to causing the electronic door locking apparatus to unlock the door.

18. The set-top box as recited in claim 16, wherein the command signal relates to causing the electronic door locking apparatus to alternate a do not disturb status.

19. A set-top box comprising:
a housing securing a television input, a television output, a processor, memory, and storage therein;
a busing architecture communicatively interconnecting the television input, the television output, the processor, the memory, and the storage;
a wireless transceiver associated with the housing and coupled to the busing architecture, the wireless transceiver operable to communicate with a proximate wireless-enabled interactive programmable device;
the television input configured to receive a source signal from an external source;
the television output configured to forward a fully tuned signal to a display; and
the memory accessible to the processor, the memory including processor-executable instructions that, when executed, cause the processor to:
pair with an electronic door locking apparatus coupled to a door, the electronic door locking apparatus being room-collocated with the set-top box,
receive a status signal from the electronic door locking apparatus, the status signal being relative to a locked/unlocked status of the door, and
send the status signal to a remote server,
specify a search operation to identify the proximate wireless-enabled interactive programmable device, wherein the search operation utilizes the wireless transceiver to wirelessly identify the proximate wireless-enabled interactive programmable device;

the memory including second processor-executable instructions that, when executed, cause the processor to:
establish a pairing between the proximate wireless-enabled interactive programmable device and the set-top box,
send formatted parallel audiovisual experience instructions to the proximate wireless-enabled interactive programmable device, wherein the formatted parallel audiovisual experience instructions are configured to provide a downstream parallel experience related to content on the television,
provide instructions for virtual buttons on a touch screen display associated with the proximate wireless-enabled interactive programmable device, the virtual buttons being associated with the proximate wireless-enabled interactive programmable device,
receive and process virtual remote control functionality input instructions from the proximate wireless-enabled interactive programmable device,
evaluate the virtual remote control functionality input instructions to assign a meaning,
generate a command signal, and
send the command signal to the electronic door locking apparatus; and the memory including third processor-executable instructions that, when executed, cause the processor to:
receive and process server control functionality input instructions from a remote server,
evaluate the functionality input instructions to assign a meaning,
generate a command signal, and
send the command signal to the electronic door locking apparatus.

* * * * *